United States Patent [19]

Throckmorton

[11] Patent Number: 4,508,881
[45] Date of Patent: Apr. 2, 1985

[54] PROCESS FOR NONAQUEOUS DISPERSION POLYMERIZATION OF BUTADIENE IN THE PRESENCE OF POLYMERIC DISPERSING AGENTS

[75] Inventor: Morford C. Throckmorton, Akron, Ohio

[73] Assignee: The Goodyear Tire & Rubber Company, Akron, Ohio

[21] Appl. No.: 612,225

[22] Filed: May 21, 1984

Related U.S. Application Data

[63] Continuation-in-part of Ser. No. 420,065, Sep. 20, 1982, Pat. No. 4,452,960.

[51] Int. Cl.³ ............................................... C08F 2/14
[52] U.S. Cl. .................................................. 526/201
[58] Field of Search ............................. 526/201, 340.2

[56] References Cited

U.S. PATENT DOCUMENTS

| | | | |
|---|---|---|---|
| 3,215,679 | 11/1965 | Trepka | 526/340.2 |
| 3,644,585 | 2/1972 | Takayanagi | 526/340.4 |
| 4,098,980 | 7/1978 | Markle | 526/340.4 |

*Primary Examiner*—Paul R. Michl
*Attorney, Agent, or Firm*—Alvin T. Rockhill

[57] ABSTRACT

A nonaqueous dispersion polymerization process can offer many distinct advantages over other polymerization techniques including: improved heat transfer, increased production capacity, and energy savings. This invention discloses a process for the nonaqueous dispersion polymerization of butadiene monomer in a reaction mixture containing a liquid nonaqueous dispersion medium, the improvement which comprises carrying out the polymerization of the butadiene monomer in the presence of random copolymers of butadiene and isoprene, to produce very high cis-1,4-polybutadiene.

19 Claims, No Drawings

PROCESS FOR NONAQUEOUS DISPERSION POLYMERIZATION OF BUTADIENE IN THE PRESENCE OF POLYMERIC DISPERSING AGENTS

This application is a continuation-in-part of Ser. No. 420,065, filed Sept. 20, 1982 (now issued as U.S. Pat. No. 4,452,960).

BACKGROUND OF THE INVENTION

Many polymerization processes are used in the formation of synthetic polymers. For example, the polymerization of a polymer can be conducted in a number of different types of reaction systems, including bulk polymerization, suspension polymerization, emulsion polymerization, and solution polymerization. Each of these systems has certain advantages and disadvantages.

Bulk polymerization is the direct conversion of liquid monomers to polymer in a reaction system in which the polymer remains soluble in its own monomer. Such bulk polymerizations are generally carried out by the addition of an initiator to a simple homogeneous system containing one or more monomers. The synthesis of polystyrene by the addition of a free radical initiator to styrene monomer is a good example of a very common bulk polymerization. The principal advantage of a bulk polymerization process is that the product obtained can be used directly since it is essentially free of solvents and impurities. One disadvantage of bulk polymerization reactions is that it is difficult to control the reaction temperature during polymerization.

In suspension polymerization, the initiator is dissolved in the monomer, the monomer is dispersed in water, and a dispersing agent is incorporated to stabilize the suspension formed. All suspension polymerization processes use some type of surfactant to keep the monomer globules dispersed during the reaction in order to avoid coalescence and agglomeration of the polymer. Not only does the suspension stabilizer affect the particle size and shape, but also the clarity, transparency and film-forming properties of the resultant polymer. A variety of dispersing agents including water-insoluble, finely divided, inorganic materials and organic materials, depending upon the monomer to be polymerized, have been used as dispersing agents. Thus, for example, talc, barium calcium and magnesium carbonates, silicates, phosphates and sulfates, as well as poly(vinyl alcohol), tragacanth gum, salts of styrene-maleic anhydride copolymers, vinyl acetate-maleic anhydride copolymers and their salts, starch, gelatin, pectin, alginates, methyl cellulose, carboxymethyl-cellulose, bentonite, limestone and alumina have been used as suspending agents. A major advantage of suspension polymerization is that the polymeric products are obtained in the form of small beads which are easily filtered, washed and dried. For reasons of cost and unreactivity, water is a much more desirable diluent and heat-transfer medium than most organic solvents.

However, in certain polymerization processes, for example, the preparation of very high cis-1,4-polybutadiene, while utilizing nickel catalyst systems the presence of any moisture is highly undesirable. Thus, suspension polymerization in a water medium is not an effective process for the synthesis of very high cis-1,4-polybutadiene utilizing nickel catalyst systems.

An emulsion polymerization process is considered to be a three-phase reaction system consisting of large droplets of the monomer, the aqueous phase containing the dissolved initiator, and the colloidal particles of monomer-swollen polymer. While the emulsion polymerization process has the economic advantage of using water as the emulsion base, not all polymerization processes can tolerate the presence of water. Such is the case with the polymerization of butadiene into very high cis-1,4-polybutadiene utilizing nickel catalyst systems.

In solution polymerization, an organic solvent is used which is capable of dissolving the monomer, the polymer and the polymerization catalyst or initiator. Inasmuch as the polymer is soluble in the organic solvent which is used, there is a tendency for the viscosity of the solution to increase as the molecular weight of the polymer increases. If this continues over a period of time, the solution becomes too viscous to handle in conventional polymerization reaction systems unless the solids content is limited to a low level. In commercial polymerization processes, it is desirable to obtain a polymerization mass which has a high concentration of solid polymer and, at the same time, comprises a material which is easy to handle and does not agglomerate on the walls of the reaction vessel.

A process for the nonaqueous dispersion polymerization of butadiene monomer into a very high cis-1,4-polybutadiene would be very desirable. Such a nonaqueous dispersion polymerization process could offer several distinct advantages over other possible polymerization techniques, including improved heat transfer, higher polymer concentrations in the reaction medium, increased production capacity, and energy saving.

A process for the nonaqueous dispersion polymerization of butadiene monomer in a liquid nonaqueous dispersion medium, for instance, n-butane or n-pentane with a Ziegler-Natta catalyst which utilizes a block copolymer dispersion stabilizer is described in U.S. Pat. No. 4,098,980 to Richard A. Markle and Richard G. Sinclair (assigned to The Goodyear Tire & Rubber Company). This reference is hereby incorporated by reference in its entirety. The block copolymer dispersion stabilizer utilized in U.S. Pat. No. 4,098,980 is a copolymer which contains at least two blocks of polymer linked by chemical valences, at least one block (A block) is soluble in liquid organic dispersion medium and at least another block (B block) is insoluble in the dispersion medium and the stabilizer acts to disperse the polybutadiene which is formed in the stabilizer's presence.

SUMMARY OF THE INVENTION

In accordance with the present invention, a process is provided for the nonaqueous dispersion polymerization of butadiene monomer in a liquid nonaqueous dispersion medium utilizing random copolymers of butadiene and isoprene as the dispersion stabilizer (dispersing agent) to produce very high cis-1,4-polybutadiene.

The butadiene monomer is polymerized to very high cis-1,4-polybutadiene (95% or more cis-1,4-isomeric butadiene units) in a nonaqueous medium in which the very high cis-1,4-polybutadiene is essentially insoluble.

Some representative examples from which this medium can be selected include n-butane, isobutane, n-pentane, isopentane, neopentane, and isobutylene, and mixtures or combinations of any or all of these hydrocarbons. Standard nickel catalyst systems for the synthesis of very high cis-1,4-polybutadiene can be used in this polymerization technique.

This invention discloses a process for the nonaqueous dispersion polymerization of butadiene monomer in a reaction mixture containing a liquid nonaqueous dispersion medium, the improvement which comprises carrying out the polymerization of the butadiene monomer in the presence of random copolymers of butadiene and isoprene to produce very high cis-1,4-polybutadiene.

DETAILED DESCRIPTION

Butadiene can be polymerized to a very high (95% or greater) cis-1,4-polybutadiene in a nonaqueous liquid dispersion medium containing random copolymers of butadiene and styrene to produce very high cis-1,4-polybutadiene. The nonaqueous medium in which this polymerization is run must be a very poor solvent for very high cis-1,4-polybutadiene. Some representative examples of nonaqueous media that can be employed in which the very high cis-1,4-polybutadiene is essentially insoluble include: n-butane, isobutane, n-pentane, isopentane, neopentane, 2-methylpentane, 2,2-dimethylbutane, 2,2-dimethylpentane, 2,4-dimethylpentane, 2,2,4-trimethylpentane, 2,2,3-trimethylbutane, isobutylene, 1-butene, 3-methyl-1-butene, trans-2-butene and any mixture of any or all of these nonaqueous media. Minor amounts of other hydrocarbons, which by themselves are solvents for very high cis-1,4-polybutadiene, can also be present in such a nonaqueous dispersion media; however, their presence is detrimental since even small amounts of solvent will cause swelling of the cis-1,4-polybutadiene and result in an increase in viscosity. The presence of large amounts of solvents for cis-1,4-polybutadiene will lead to the formation of a cement-like composition. Since it is desirable for these nonaqueous dispersions to have a very low viscosity it is advantageous to minimize the amount of solvents for cis-1,4-polybutadiene in the nonaqueous medium.

The liquid nonaqueous dispersion media should contain less than about 5% aromatic and cycloaliphatic hydrocarbons (which are good solvents for cis-1,4-polybutadiene) such as, benzene, toluene, cyclohexane, methylcyclohexane and the like. The nonaqueous medium must contain less than about 20% aliphatic hydrocarbons that are fair solvents for high cis-1,4-polybutadiene in order to be effective as a nonaqueous medium in the polymerization of high cis-1,4-polybutadiene. Some representative examples of such aliphatic hydrocarbons include: hexane, 3-methylpentane, 2,3-dimethylbutane, heptane, octane, 2,3-dimethylpentane, and 2,3,4-trimethylpentane.

Most olefins react too rapidly with the alkylaluminum catalysts that can be used in these polymerizations and/or are too good as solvents for the very high cis-1,4-polybutadiene to be useful as a nonaqueous dispersion media. Some olefins that are exceptions to this general rule include trans-2-butene, isobutylene, 1-butene and 3-methyl-1-butene which can be used with good success as nonaqueous dispersion media. Fluorohydrocarbons can also be used very successfully as the nonaqueous dispersion media for the synthesis of very high cis-1,4-polybutadiene. Some representative examples of fluorohydrocarbons that can be employed as the nonaqueous dispersion media include 1,1,1,2,2,-pentafluoropropane, decafluorobutane, octafluorobutane and the like.

Several factors are important in selecting the preferred medium for the nonaqueous dispersion polymerization of very high cis-1,4-polybutadiene. If the medium has a very low boiling point, it is necessary to operate the system at a relatively high pressure and/or low temperature. If the medium has a relatively high boiling point, more energy is required to recover and/or remove the last traces of the medium from the polymer. Other things being equal, the dispersed particles will stay dispersed or suspended slightly better in a high density medium than it will in a medium having a relatively low density. One of the most important factors in selection of a preferred nonaqueous medium is the relative solvency of the medium for the very high cis-1,4-polybutadiene and for the dispersing agent.

The relative solvency factor is related to the solubility parameter, which is the square root of the cohesive energy density, that is, $$\text{Solubility parameter} = \sqrt{\frac{\Delta E}{V}}$$

where E is internal energy and V is the molar volume. A good medium in which to conduct nonaqueous polymerization of butadiene to very high cis-1,4-polybutadiene should have a solubility parameter between about 6 and about 7 $(cal/cc)^{\frac{1}{2}}$. The solubility parameter values are as reported by Kenneth L. Hoy in "New Values of the Solubility Parameters From Vapor Pressure Data." *Journal of Paint Technology*, vol. 42, no. 541, pp. 76–118 (1970). This article is incorporated herein by reference in its entirety.

The preferred media are n-butane, n-pentane, isopentane, 2-methylpentane, 2,2-dimethylpentane, 2,2,4-trimethylpentane, and any mixtures of two or more of these media.

It is essential to employ at least one random copolymer of butadiene and isoprene as the dispersing agent in this nonaqueous polymerization of butadiene into very high cis-1,4-polybutadiene. The amount of random butadiene/isoprene copolymers which must be present in order to produce nonaqueous dispersions for very high cis-1,4-polybutadiene can range between about 0.5 and about 15 parts by weight per 100 parts of butadiene monomer (phm) used in the polymerization. The preferred range for the amount of random copolymers of butadiene and isoprene which can be employed is between 1.5 and 5 phm.

The random butadiene/isoprene copolymers that are used as polymeric dispersing agents in the practice of this invention can have any ratio of repeat units being derived from butadiene and isoprene. However, normally a significant amount (about 5% by weight or more) of repeat units will be derived from each of the different monomer components of the polymer. Thus, these copolymers will normally contain from 5% to 95% by weight butadiene and from 5% to 95% by weight isoprene. In most cases the random copolymers of butadiene and isoprene that are employed as dispersion stabilizers will contain from 20% to 80% by weight butadiene and from 20% to 80% by weight isoprene. The repeat units derived from butadiene and isoprene in these random copolymers do not occur in any orderly sequence or specific pattern.

The random butadiene/isoprene copolymers that are preferred for use in this invention as polymeric dispersing agents have number average molecular weights ranging from about 50,000 to about 1,000,000. Polymers with number average molecular weights of over 1,000,000 can generally also be employed but normally their solubility in the nonaqueous dispersion medium is not as good.

Insignificant amounts (about 5% or less by weight) of other monomers can also be copolymerized into random copolymers of butadiene and isoprene without totally destroying their usefulness as nonaqueous dispersing agents for very high cis-1,4-polybutadiene. For example, a terpolymer of butadiene, isoprene, and 2-ethyl-(1,2-butadiene) containing only an insignificant amount of repeat units derived from 2-ethyl-(1,3-butadiene) and which contains predominantly repeat units derived from butadiene and isoprene will be useful as a dispersing agent in this invention. The polymeric dispersing agents described in this invention can generally also be mildly halogenated and will still be useful in such polymerizations of butadiene into a very high cis-1,4-polybutadiene.

The reaction mixture utilized in the nonaqueous dispersion polymerization of butadiene to produce a very high cis-1,4-polybutadiene is comprised of a liquid nonaqueous dispersion medium, a dispersing agent (a random butadiene/isoprene copolymer), butadiene monomer, and a catalyst system. Such a polymerization can be run over a temperature range from 0° up to 100° C. Most generally, it is preferred to utilize a reaction temperature from 35° C. to 70° C. The reaction time required in such a polymerization will vary with the reaction temperature utilized, catalyst system, and catalyst level. Generally, this reaction time will vary from about 20 minutes up to about 30 hours. Commonly, it will be preferred to utilize a reaction time from about 1 up to about 6 hours.

The amount of butadiene monomer that can be utilized in such a nonaqueous dispersion polymerization reaction mixture can be varied from about 3 to about 30 weight percent based upon the total reaction mixture. It is preferred to have a concentration of butadiene monomer ranging from 10 to 25 percent by weight based upon the total reaction mixture.

It is desirable to conduct this polymerization in an oxygen and moisture free environment. For example, it is desirable to sparge the reaction mixture with dry nitrogen and to run the polymerization under a dry nitrogen atmosphere. The pressure in the reaction system during the polymerization generally will be a function of the polymerization temperature, the butadiene monomer concentration, and the boiling point of nonaqueous dispersion medium. This polymerization pressure will usually be within the range between 100,000 Pa (Pascal) and 500,000 Pa.

The catalyst systems used in this nonaqueous dispersion polymerization to prepare very high cis-1,4-polybutadiene are ternary systems comprised of an organoaluminum compound, a soluble nickel containing compound, and a fluorine containing compound. The organoaluminum compound used is usually a trialkylaluminum; a dialkylaluminum hydride, or a dialkylaluminum fluoride. The preferred organoaluminum compounds include triethylaluminum (TEAL), tri-n-propylaluminum, triisobutylaluminum (TIBAL), trihexylaluminum, disisobutylaluminum hydride (DIBA-H), and diethylaluminum fluoride. Some representative examples of organonickel compounds that can be utilized include nickel benzoate, nickel naphthenate, nickel 2-ethylhexanoate, which is commonly referred to as nickel octanoate or nickel octanoate (NiOct), nickel neo-decanoate, nickel acetylacetonate, and nickel salicylaldehyde. Some representative examples of fluorine containing containing compounds that can be utilized include boron trifluoride ($BF_3$), hydrogen fluoride, boron trifluoride diethyl etherate complex, boron trifluoride di-n-butyl etherate complex, boron trifluoride phenolate complex, boron trifluoride benzaldehyde complex, boron trifluoride ethyl benzoate complex, hydrogen fluoride diethylether complex, and hydrogen fluoride di-n-butyl ether complex.

The catalysts and the procedure for preparing very high cis-1,4-polybutadiene while utilizing nickel catalyst systems are described in U.S. Pat. Nos. 3,170,907, 3,483,177, 3,856,764. All of the foregoing references are hereby incorporated by reference in their entirety. The catalyst components can be charged "in situ," premixed in the absence of any monomer, "preformed" by premixing in the presence of a minor amount of butadiene monomer, or premixed in the presence of certain polymers such as polybutadiene.

This nonaqueous dispersion polymerization can be run by simply adding the catalyst components to a nonaqueous dispersion medium which contains butadiene monomer and the polymeric dispersing agent to form the reaction mixture. In a continuous polymerization process, all components are added simultaneously. During the course of the polymerization it will generally be desirable to provide some form of agitation to the reaction mixture, such as stirring, shaking, or tumbling. A shortstopping agent may be employed to terminate the polymerization after the desired reaction time or at the desired percent conversion of monomer to polymer. Antioxidants can also be added to these nonaqueous dispersions of very high cis-1,4-polybutadiene.

The nonaqueous dispersions formed in this polymerization process may have concentrations of very high cis-1,4-polybutadiene ranging between about 14 and 20 weight percent which are quite fluid and permit greatly improved heat transfer in comparison to that occurring with the very viscous, highly swollen polybutadiene cement of similar concentrations produced when using solution polymerization techniques. Due to the relative fluidity of these nonaqueous dispersions, the concentration of dispersed very high cis-1,4-polybutadiene in the medium can be increased by 25 to 60% over the maximum allowable concentrations in solution polymerization techniques. Thus, polymer concentrations prepared by the nonaqueous polymerization procedure may range between about 25 and about 35 weight percent. This is achieved while maintaining adequate fluidity and heat transfer. Therefore, the production capacity of a given polymerization reactor can be greatly increased. The viscosity of the nonaqueous dispersion will increase sharply as the concentration of very high cis-1,4-polybutadiene in the dispersion increases.

A further advantage of using this nonaqueous dispersion polymerization technique is that the polymerization medium can be recovered and used directly for further polymerizations without the usual steam stripping, distillation, and drying since the dispersed particles can be removed by centrifuging, sedimentation or filtration.

For example, a nonaqueous dispersion can be mixed with about 1 phr of di-tertiary-butyl-p-cresol and a trace of methanol (0.1 to 0.5% by weight) and then charged into a rotary drum vacuum filter where the bulk of the liquid nonaqueous dispersion medium can be removed and pumped to a premix makeup tank where fresh butadiene can be added for utilization in further polymerizations. The filter cake of very high cis-1,4-polybutadiene can then be removed mechanically and/or by using a reverse flow of an inert gas or nitrogen to help dislodge the polymer from the filter cloth. The drying of the filter cake can be completed by passing it through a tunnel dryer or an expeller and extruder dryer.

An alternative method of recovering the solid high cis-1,4-polybutadiene from the nonaqueous dispersion medium is by centrifuging. For example, an automatic batch centrifuge can be employed. Separation by sedimentation followed by removal (pumping off) of the supernatant liquid can also be used. However, this is generally a much slower and less effective process.

A portion of the liquid nonaqueous dispersion medium from either the filtration, centrifucation or sedimentation operations will generally have to be distilled in a fractionating column before it is returned to the premix makeup tank for use in additional polymerizations. This is in order to prevent buildup of excessive amounts of impurities in the recycled dispersion medium. Distillation of 15 to 25% by weight of the recycle medium normally will suffice although the amount will depend upon operating conditions.

Such a nonaqueous dispersion can also be processed in a manner similar to that customarily utilized in solution polymerization techniques, where the "cement" is mixed with water and steam which coagulate the polymer and vaporize the solvent and unreacted monomer. This is a very energy intensive process wherein water is emoved from the "crumb" rubber in a dewatering tank and trough, a water expeller, and an extruder dryer. Several other variations in centrifuging, filtration and sedimentation operations are described by W. L. McCabe and J. C. Smith in *Unit Operations of Chemical Engineering*, Third Edition, McGraw-Hill Chemical Engineering Series, Chapter 30, pages 922–972 (1976). This article is incorporated herein by reference in its entirety.

DESCRIPTION OF THE PREFERRED EMBODIMENTS

This invention is illustrated by the following examples which are merely for the purpose of illustration and are not to be regarded as limiting the scope of the invention or manner in which it may be practiced. Unless specifically indicated otherwise, parts and percentages are given by weight. Inherent viscosities were determined at a concentration of 0.5 weight percent in toluene at 30° C.

Brookfield viscosities for the dispersions were determined at 25° C. using a Brookfield viscometer, Model LVF manufactured by Brookfield Laboratories, Inc. The very high cis-1,4-polybutadiene samples were separated from the nonaqueous mediums by air drying on drying trays followed by vacuum drying to constant weight (unless indicated otherwise).

The dispersions have been rated arbitrarily according to their relative appearance, that is, how well the polymer particles stay suspended and dispersed in the polymerization medium. The ratings expressed in a descending order of relative quality are; Excellent>Fine>-Very Good>Good>Fair>Poor>not a NAD (nonaqueous dispersion).

EXAMPLES 1 THROUGH 6

A solution of butadiene in n-pentane was prepared and passed down a column containing silica gel. Measured quantities of this solution were charged into a series four ounce (118 ml) bottles. These solutions were well sparged with dry nitrogen after which time they contained about 9 grams of butadiene per 100 milliliters of solution (the solution contained 14.4 weight percent butadiene).

Various random copolymers of butadiene and isoprene were added to these solutions as dispersing agents in the amounts shown in Table I. These random butadiene/isoprene copolymers were prepared by two different procedures and at several different weight ratios of the monomers. The ratios of the butadiene to isoprene monomers used in the synthesis of these polymers is designated as B:I in Table I. In Examples 1 through 4 the random butadiene/isoprene copolymers were emulsion polymerized and in Examples 5 and 6 the random butadiene/isoprene copolymers were solution polymerized.

Catalysts were added to these butadiene in n-pentane solutions containing the various random butadiene/isoprene copolymers by utilizing an "in situ" technique. In order to start the polymerizations the catalyst components were added to each of these solutions in the order triethylaluminum (TEAL), nickel octanoate (NiOct) and boron trifluoride.dibutylether complex ($BF_3.Bu_2O$). The TEAL and NiOct added were previously dissolved in n-pentane and the $BF_3.Bu_2O$ was previously dissolved in hexane. The total amount of catalyst charged as parts per hundred parts of monomer (phm) into the reaction solutions is shown in Table I. In Examples 1, 2, 3 and 5, the amounts of individual catalyst components charged were 1.0 millimoles of TEAL per 100 g of butadiene monomer (mhm), 0.075 mhm of NiOct and 2.0 mhm of $BF_3$ as $BF_3.Bu_2O$; in Example 4, the catalyst charge was 3.2 mhm TEAL, 0.19 mhm NiOct and 4.8 mhm $BF_3$; and 1.1 mhm TEAL, 0.085 mhm NiOct and 2.0 mhm of $BF_3$ as $BF_3.Bu_2O$ were charged in Example 6. The bottles were tightly capped and rotated end-over-end in a water bath at 50° C. The polymerizations were allowed to run for 3.5 hours in Examples 1, 2, and 3; for 16 hours in Example 4; and for about 4 hours in Examples 5 and 6.

TABLE I

| Example | Dispersant B:I | , phm | Catalyst conc'n, phm | Dispersion Appearance | Polymer Yield, % | DSV, dl/g |
| --- | --- | --- | --- | --- | --- | --- |
| 1 | 75:25 | 5 | 0.27 | Very good | 88 | 2.8 |
| 2 | 50:50 | 3 | 0.27 | Fair | 92 | 3.2 |
| 3 | 50:50 | 5 | 0.27 | Very good | 67 | ND |
| 4 | 25:75 | 5 | 0.75 | Good | 81 | 3.7 |
| 5 | 30:70 | 3 | 0.27 | Good | 89 | 2.5 |
| 6 | 50:50 | 5 | 0.30 | Very good | 90 | 2.2 |

ND - not determined

Very good dispersions were prepared while utilizing 5 phm of either the emulsion or the solution polymerized copolymers as dispersing agents. The Brookfield viscosity of the dispersion prepared in Example 3 was 4 centipoises (using #1 spindle at 60 rpm) and the average diameter of the dispersed particles was 1 micrometer. The microstructure of the solution-prepared dispersants contained about 65% of 1,2- and 3,4-structures, while the emulsion type of copolymers contained about 12 to 16% vinyl type structures. The presence of pendant vinyl groups in the polymeric dispersant appears to improve its action as a polymeric dispersing agent.

These examples show that random butadiene/isoprene copolymers have excellent properties as dispersing agents in the polymerization of high cis-1,4- polybutadiene. Yields of 94 percent and dispersions with a very good appearance were obtained.

EXAMPLES 7 THROUGH 10

A purified premix containing about 9 grams of 1,3-butadiene per 100 ml of solution was prepared using the procedure described in Examples 1 through 6, except that isopentane was used in these Examples as the polymerization medium rather than n-pentane and that the catalyst concentrations used were 1.0 mhm TEAL, 0.07 mhm NiOct, and 1.6 mhm $BF_3.Bu_2O$ (boron trifluoride.dibutyl ether complex). The polymer used as the dispersing agent and the amount of it added are shown in Table II. The polymerizations were allowed to run for 3 hours. Example 10 is a comparative example which employs a copolymer of isoprene and styrene as the dispersing agent.

TABLE II

| Example | Dispersant, phm | NAD Appearance | Yield, % |
|---|---|---|---|
| 7 | 50 Bd/50 Ip 3 | Fair to Good | 61 |
| 8 | 25 Bd/75 Ip 3 | Settled* | 59 |
| 9 | 25 Bd/75 Ip 5 | Settled Rapidly* | 78 |
| 10 | 75 Ip/25 Sty 3 | Not a NAD | 99 |

50 Bd/50 IP - emulsion prepared copolymer of 50% butadiene and 50% isoprene.
25 BD/75 IP - emulsion prepared copolymer of 25% butadiene and 75% isoprene.
75 IP/25 Sty - emulsion prepared copolymer of 75% isoprene and 25% styrene.
*re-dispersed readily Fairly good dispersions were prepared in Examples 7 through 9, with the best dispersion being prepared in Example 7. Some of the particles in the other experiments coalesced and settled to the bottom of the bottles. Large sized particles, similar to a coarse powder or very fine sand were formed in Example 9. These particles settled rapidly when they were not agitated but they did not coalesce or stick to the glass and so were redispersed when agitated again.

The isoprene/styrene copolymer did not function as a dispersing agent. The polybutadiene plated out onto the glass bottle and/or balled-up forming balls of swollen sticky polymer in Example 10. The polymers produced had DSV's ranging from 3.3 dl/g to 4.2 dl/g.

While certain representative embodiments and details have been shown for the purpose of illustrating the invention, it will be apparent to those skilled in this art that various changes and modifications may be made therein without departing from the scope of the invention.

What is claimed is:

1. A process for the nonaqueous dispersion polymerization of butadiene monomer in a reaction mixture containing a liquid nonaqueous dispersion medium, the improvement which comprises carrying out the polymerization of the butadiene monomer in the presence of random copolymers of butadiene and isoprene to produce very high cis-1,4-polybutadiene.

2. A process as specified in claim 1 wherein the solubility parameter of said liquid nonaqueous dispersion medium is between about 6 and 7 $(cal/cc)^{\frac{1}{2}}$.

3. A process as specified in claim 1 wherein the amount of said random copolymers of butadiene and isoprene present is between about 0.5 and about 15 phm.

4. A process as specified in claim 3 wherein the amount of said random copolymers of butadiene and isoprene present is between 1.5 and 5 phm.

5. A process as specified in claim 1 wherein said random copolymers of butadiene and isoprene have a number average molecular weight ranging from about 50,000 to about 1,000,000.

6. A process as specified in claim 1 wherein the amount of said butadiene monomer in said reaction mixture is from about 3 to about 30 weight percent based upon the total reaction mixture.

7. A process as specified in claim 6 wherein the amount of said butadiene monomer in said reaction mixture is from 10 to 25 weight percent based upon the total reaction mixture.

8. A process as specified in claim 1 wherein said polymerization is carried out at a temperature from 0° C. to 100° C.

9. A process as specified in claim 1 wherein said polymerization is carried out at a temperature from 35° C. to 70° C.

10. A process as specified in claim 1 wherein said liquid nonaqueous dispersion medium is at least one member selected from the group consisting of n-butane, n-pentane, isopentane, 2-methylpentane, 2,2-dimethylpentane and 2,2,4-trimethylpentane.

11. A process as specified in claim 1 wherein the amount of said random copolymers of butadiene and isoprene present is between about 0.5 and about 15 phm; wherein said random copolymers of butadiene and isoprene have a number average molecular weight ranging from about 50,000 to about 1,000,000; wherein the amount of said butadiene monomer in said reaction mixture is from about 3 to about 30 weight percent based upon the total reaction mixture; and wherein said polymerization is carried out at a temperature from 0° C. to 100° C.

12. A process as specified in claim 11 wherein the solubility parameter of said liquid nonaqueous dispersion medium is between about 6 and about 7 $(cal/cc)^{\frac{1}{2}}$.

13. A process as specified in claim 12 wherein the amount of said random copolymers of butadiene and isoprene present is between 1.5 and 5 phm, wherein the amount of said butadiene monomer in said reaction mixture is from 10 to 25 weight percent based upon the total reaction mixture; and wherein said polymerization is carried out at a temperature from 35° C. to 70° C.

14. A process as specified in claim 13 wherein said random copolymers of butadiene and isoprene contain from 20% to 80% by weight butadiene and from 20% to 80% by weight isoprene.

15. A process as specified in claim 14 wherein said liquid nonaqueous dispersion medium is at least one member selected from the group consisting of n-butane, n-pentane, isopentane, 2-methylpentane, 2,2-dimethylpentane and 2,2,4-trimethylpentane.

16. A process as specified in claim 2 wherein said random copolymers of butadiene and isoprene contain from 20% to 80% by weight butadiene and from 20% to 80% by weight isoprene.

17. A process as specified in claim 16 wherein said random copolymers of butadiene and isoprene have a number average molecular weight ranging from about 50,000 to about 1,000,000.

18. A process as specified in claim 17 wherein the amount of said random copolymers of butadiene and isoprene present is between about 0.5 and about 15 phm.

19. A process as specified in claim 18 wherein said polymerization is carried out at a temperature from 0° C. to 100° C. and wherein the amount of said butadiene monomer in said reaction mixture is from about 3 to about 30 weight percent based upon the total reaction mixture.

* * * * *